United States Patent [19]

Cilento et al.

[11] 4,073,861

[45] Feb. 14, 1978

[54] METHOD OF USING DRYING OILS AS OXYGEN SCAVENGER

[75] Inventors: Rudolfo D. Cilento, North Brunswick; John Anthony Hill, New Brunswick, both of N.J.

[73] Assignee: E. R. Squibb & Sons, Inc., Princeton, N.J.

[21] Appl. No.: 627,565

[22] Filed: Oct. 31, 1975

[51] Int. Cl.² .......................... C01B 13/00; C09K 3/00
[52] U.S. Cl. ..................................... 423/219; 252/188
[58] Field of Search ................ 423/210, 219; 252/188; 260/406

[56] References Cited

U.S. PATENT DOCUMENTS

| 2,825,651 | 3/1958 | Loo et al. | 252/188 |
| 3,169,068 | 2/1965 | Bloch | 252/188 |

OTHER PUBLICATIONS

Hackh's Chemical Dictionary 4 ed., 1969, p. 225.
The Condensed Chemical Dictionary, 1962, p. 423.
Textbook of Biochemistry, West et al., 1966, p. 143.
The Condensed Chemical Dictionary, 6 ed., 1962, p. 919.

*Primary Examiner*—O. R. Vertiz
*Assistant Examiner*—Gregory A. Heller
*Attorney, Agent, or Firm*—Lawrence S. Levinson; Merle J. Smith; Burton Rodney

[57] ABSTRACT

A method is provided for reducing and substantially eliminating the presence of oxygen in a sealed container or package, which method includes the step of disposing or placing a drying oil, such as linseed oil, in the sealed container, for example, in the form of a small capsule having one or more openings and containing linseed oil absorbed on a spongy substrate or particulate material. The oxygen in the container will react with the linseed oil and thereby be removed from the container atmosphere. In addition, a foraminous capsule is provided containing drying oil, such as linseed oil, sorbed on a porous or particulate substrate, for use in carrying out the above method. A method is also provided for measuring the rate of oxygen transmission through a film or package walls or into a container employing drying oils as described above.

6 Claims, No Drawings

METHOD OF USING DRYING OILS AS OXYGEN SCAVENGER

The present invention relates to a method for reducing and substantially eliminating oxygen from sealed containers by employing in the container a drying oil, such as linseed oil, contained in a capsule, to react with the oxygen and thereby remove the same, to a method of measuring oxygen transmission through a film or container wall, or into a package and to a capsule containing a drying oil to be used in the above methods.

The use of desiccants such as calcium chloride, calcium oxide, charcoal, silica gel and the like for sorbing moisture from containers containing chemicals, foods, medicaments, and the like has received wide acceptance. However, where it has been attempted to include in containers a practical chemical which would react with substantially all atmospheric oxygen to prevent oxygen degradation of the materials contained therein, such efforts have generally met with failure. Accordingly, air and/or oxygen are usually removed by flushing the containers with nitrogen or carbon dioxide which is a time-consuming and expensive operation. It has also been suggested to employ laminates or sandwich structures which contain oxidation catalysts, such as palladium. The use of such materials has received some, albeit very limited, acceptance.

The rate of oxygen transmission through complete or sealed packages or films is, of course, directly related to the air tightness thereof. The presently available methods for effecting such a determination require complex and extremely costly instrumentation. Accordingly, a real and apparent need exists today for a method for removing oxygen from closed systems as well as a method for measuring the rate of oxygen transmission into such systems, which methods are effective and relatively simple and economical to carry out.

In accordance with the present invention, a method is provided which is effective in reducing and substantially eliminating the presence of oxygen in a sealed container or package. Such method comprises disposing a drying oil in the sealed container, the drying oil preferably being retained or sorbed in a porous or particulate substrate. The oxygen in the container reacts with the drying oil to remove the same from the atmosphere in the container.

In another aspect of the present invention the rate of flow of oxygen through a film, package or container is ascertained by providing a drying oil retained or sorbed in a porous or particulate substrate, the drying oil-substrate combination having an initial known weight, disposing the drying oil-substrate combination in the interior of the package or container (which may contain a panel of the film to be tested), and after a predetermined period, ascertaining the weight of the drying oil-substrate combination and determining the difference between said initial weight and said weight after said predetermined period.

The drying oil may be retained or sorbed (absorbed) in any type of inert spongy or porous substrate material or particulate material, which is non-reactive to the drying oil or material to be packaged in the container or package. Thus, for example, the substrate material may comprise natural or synthetic sponges, polymeric foams, such as polyurethane foam, silica gel, cotton cloth, paper, glass wool, charcoal, and the like. A sufficient amount of the porous substrate will be employed so that substantially all of the drying oil available will be sorbed in the substrate. In this manner, a maximum drying oil surface area will be available for oxygen uptake.

The drying oils suitable for use include those which are high in unsaturated glycerides, such as linseed oil, tung oil, soybean oil, cottonseed oil and safflower oil. Preferred are linseed oil and tung oil, with linseed oil being most preferred.

Where the drying oil employed is linseed oil, it has been found that the rate at which the linseed oil reacts with or sorbs oxygen can be accelerated by heating the linseed oil at a temperature within the range of from about 30° to about 180° C, and preferably from about 100° to about 160° C for a period within the range of from about 30 minutes to about 3 hours and preferably from about 60 minutes to about 2 hours. The so-heated linseed oil may then optionally be treated with air (oxygen), for example by bubbling an amount of air within the range of from about 0.001 to about 0.05 liters/min/cc linseed oil and preferably from about 0.01 to about 0.02 liters/min/cc linseed oil. Such treatment accelerates the rate of chemical reaction of the linseed oil with atmospheric oxygen while the linseed oil is able to absorb from about 12 to about 15% of its weight in oxygen on exposure to atmospheric air in a few days.

The drying oil-substrate combination will preferably be enclosed in a capsule, ampul or other protective body of any desired shape which includes one or more openings for admission of oxygen into contact with the drying oil. The protective body may be formed of gelatin, plastic, cardboard, metal, fabrics, paper, glass, or any other conventional material which will prevent direct contact of the drying oil with medicaments, confections, other foods, or chemicals and the like which are packaged or present in the container in which the drying oil is disposed.

A preferred embodiment of the present invention comprises boiled linseed oil fully sorbed on a piece of polyurethane foam contained in a gelatin capsule.

The amount of drying oil that will be employed depends upon the type of drying oil used and the volume of air present in the container or package or the relative amount of air expected to pass from the surrounding atmosphere into the interior of the package, container or through the film. Thus, for example, where linseed oil is employed as the drying oil, the amount of linseed oil used will range from about 0.002 to about 0.02 cc/cc of air present in the package or container, and preferably from about 0.005 to about 0.01 cc/cc of air.

The following Examples represent preferred embodiments of the present invention. All temperatures are expressed in degrees Centigrade.

EXAMPLE 1

*To demonstrate that linseed oil can adsorb oxygen in a sealed container and reduce the oxygen content to a very low concentration*

Linseed oil, 1.8 g, is soaked into a piece of polyurethane foam and placed inside a desiccator. The desiccator is flushed with nitrogen and then 100 cc of pure oxygen is introduced into it. The pressure inside the desiccator steadily drops for a period of 2-3 weeks. At the end of 3 weeks, 23 mmHg drop in pressure is registered. The desiccator is opened and the polyurethane foam found to have gained 0.1216 g. Calculations show that 84% of oxygen introduced is removed and the oxygen concentration of the desiccator is reduced from 3.7% at start to 0.5% at the finish.

EXAMPLE 2

To demonstrate the feasibility of preparing oxygen-scavenger capsules

Pieces of polyurethane foam (5×5×12 mm) are soaked with linseed oil, 0.1-0.3 g, and are placed into standard gelatin capsule shells. The shells are pierced at various spots, exposed to the environment, and periodically weighed. After 5 days the capsules have gained in weight 10.6-13.5% of the oil used, after 10 days 10.8-13.6%, after 15 days 11.4-13.8%. A number of capsules so prepared are stored in a sealed container and exposed to the environment at a later date with the same results.

EXAMPLE 3

To demonstrate that capsules prepared as in Example 2 can be used to test the oxygen diffusion rate through preformed blister packs A capsule is introduced into each of a number of preformed blister packs of PVC. The capsules are sealed in the blister packs with aluminum foil using epoxy resin, exposed to the environment and periodically weighed. At the end of 2 months 8 units have gained 1 to 4 mg, while 4 units have gained 16 to 25 mg in the first 10 to 15 days after which they gain no more. The weight pick up by these 4 units calculate to 13–15% of the input oil; close inspection of these units with a magnifying glass reveals small channels across the epoxy resin.

EXAMPLE 4

To demonstrate that linseed oil can be used to measure oxygen diffusion rate across films and membranes Linseed oil, 2-3 g, soaked on polyurethane foam is sealed inside of Vapometers (cups of the type used in ASTM E96 for water vapor transmission study). A modification of this is made by placing the linseed oil on polyurethane foam inside of plastic bottles on the side of which a hole has been sealed by cementing on it a film of the material to be tested. Within a few days both the cups and the bottles show signs of low pressure inside by the concave shape assumed by the film under test. The samples are weighed periodically for weeks. An increase in weight of the order of magnitude of that expected from published data for the materials under test are registered.

What is claimed is:

1. A method for reducing and substantially eliminating the presence of oxygen in a sealed container or package, which comprises disposing in said container liquid linseed oil retained or sorbed in a porous or particulate substrate material, said linseed oil-substrate combination being disposed in a protective capsule or ampul which includes openings to allow admission of oxygen into contact with the linseed oil, said linseed oil being present in an amount ranging from about 0.002 to about 0.02 cc/cc of air present in the package or container said amount being sufficient to react with substantially all of the oxygen in the container.

2. The method as defined in claim 1 wherein said substrate material is polyurethane foam or charcoal.

3. The method as defined in claim 1 wherein said linseed oil has been subjected to heat treatment by heating same at a temperature ranging from about 30° to about 180° C.

4. The method as defined in claim 1 wherein said protective covering takes the form of a capsule.

5. The method defined in claim 1 wherein said drying oil comprises boiled linseed oil, said substrate comprises a piece of polyurethane foam and said linseed oil-polyurethane foam are retained in a gelatin capsule.

6. The method as defined in claim 3 further including the step of bubbling air or oxygen through the heated linseed oil.

* * * * *